(75.)
JOHN JOHNSON.
Corn Harvester.
No. 122,176.     *Fig. 1.*     Patented Dec. 26, 1871.
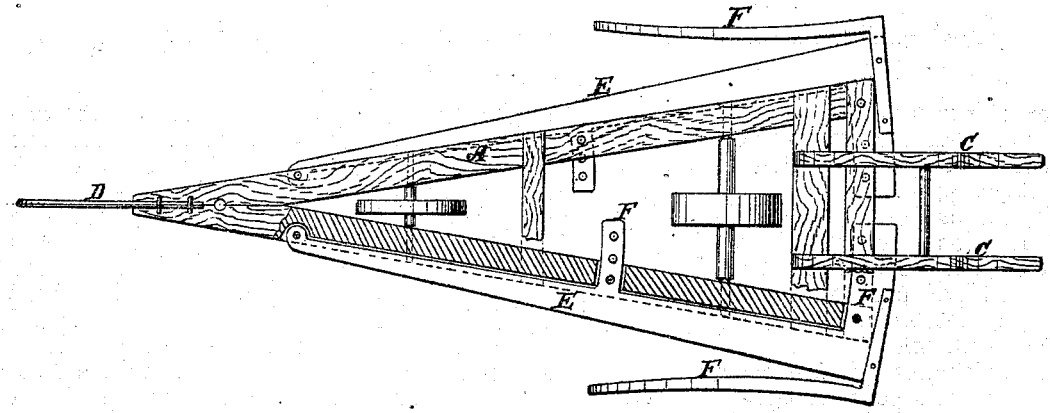
*Fig. 2.*
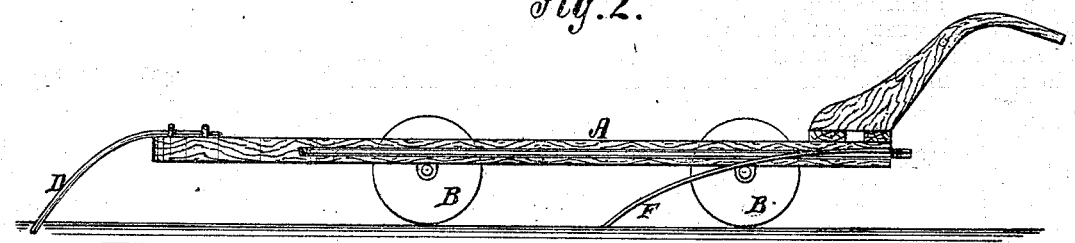

UNITED STATES PATENT OFFICE.

JOHN JOHNSON, OF MOTT HAVEN, NEW YORK.

IMPROVEMENT IN CORN-HARVESTERS.

Specification forming part of Letters Patent No. 122,176, dated December 26, 1871.

*To all whom it may concern:*

Be it known that I, JOHN JOHNSON, of Mott Haven, in the county of Westchester and State of New York, have invented a new and Improved Corn-Harvester; and I do hereby declare that the following is a full, clear, and exact description thereof, which will enable others skilled in the art to make and use the same, reference being had to the accompanying drawing forming part of this specification.

My invention relates to improvements in corn-harvesters; and it consists in the improvement of corn-harvesters, as hereinafter fully described and subsequently pointed out in the claim.

Figure 1 is partly a plan or partly a horizontal section of my improved machine, and Fig. 2 is a side elevation.

Similar letters of reference indicate corresponding parts.

A is a triangular frame mounted on rollers B, with handles C at the rear end, a bent finger, D, at the front for running along the ground under the stalks lying thereon and lifting them up to the top, a long cutter, E, on each side, and a finger, F, in communication with each cutter for bringing the stalks up to the cutters. The cutters are fitted in a groove in the side of the side piece of the frame, pivoted to them near the front end, and arranged to swing out and back at the rear end, according to the distance between the rows. They are provided with the curved arms F, with holes for inserting pins to hold them in any position. They are also provided with a bent finger, G, at the heel, to run along the ground on the opposite side of the row, which is to be received in the angle between the cutter and finger for gathering the stalks into said angle for being cut, two rows at a time, as the machine is drawn between them.

Having thus described my invention, I claim as new and desire to secure by Letters Patent—

The centrally-arranged lifter D, backwardly-diverging knives E E, and guide-fingers F F, combined and arranged on a wheeled frame, as described, and for the purpose specified.

JOHN JOHNSON.

Witnesses:
GEO. W. MABEE,
T. B. MOSHER.

(75)